United States Patent [19]

Bechstein et al.

[11] Patent Number: 5,528,768

[45] Date of Patent: Jun. 18, 1996

[54] MULTIPROCESSOR COMMUNICATION SYSTEM HAVING A PARITIONED MAIN MEMORY WHERE INDIVIDUAL PROCESSORS WRITE TO EXCLUSIVE PORTIONS OF THE MAIN MEMORY AND READ FROM THE ENTIRE MAIN MEMORY

[75] Inventors: Norbert Bechstein, Höchstadt; Klaus Pulletz, Nürnberg; Wolfgang Grabe, Weisendorf, all of Germany

[73] Assignee: Siemens Aktiengesellschaft, Munich, Germany

[21] Appl. No.: 590,357

[22] Filed: Sep. 28, 1990

[30] Foreign Application Priority Data

Sep. 29, 1989 [EP] European Pat. Off. ............. 89118080

[51] Int. Cl.⁶ ............................. G06F 12/00; G06F 12/14
[52] U.S. Cl. .................. 395/425; 364/246; 364/246.2; 364/DIG. 1; 364/931.46; 364/DIG. 2; 395/479; 395/480
[58] Field of Search .............................. 395/400, 425; 364/200 MS File, 900 MS File

[56] References Cited

U.S. PATENT DOCUMENTS

| | | | |
|---|---|---|---|
| 3,905,023 | 9/1975 | Perpiglia | 395/575 |
| 4,212,057 | 7/1980 | Devlin et al. | 395/425 |
| 4,403,283 | 9/1983 | Myntti et al. | 395/425 |
| 4,622,631 | 11/1986 | Frank et al. | 395/800 |
| 4,719,562 | 1/1988 | Bailly et al. | 364/200 |
| 4,870,572 | 9/1989 | Hosono et al. | 395/425 |

OTHER PUBLICATIONS

Mesures, vol. 49, No. 6, 16 Apr. 1984, pp. 7, 9–12, 14, 21, 25, Paris, Fr; "*Les automates programmables ont desormais leurs reseaux locaux*".
Elektronik, vol. 31, No. 2, 29 Jan. 1982, pp. 87–95, Munich, DE; H. Schmid: "*Multi–Mikro–prozessor–Systeme*".
Angewandte Informatik/Applied Informatics, vol. 29, No. 12, Dez. 1987, pp. 501–508, Wiesbaden DE; L. Krings et al.: "*Mehrprozessorsysteme: Erfahrungen aus dem M5PS–Projekt*".
IBM Technical Disclosure Bulletin, vol. 22, No. 7, Dec. 1979, pp. 2893–2895, New York, US, R. C. Summers et al.: "*Message–based protocol for interprocessor communication*".

Primary Examiner—Rebecca L. Rudolph
Assistant Examiner—F. J. Asta
Attorney, Agent, or Firm—Kenyon & Kenyon

[57] ABSTRACT

A communication system which makes possible a very fast data exchange between connected stored program controls, which is important especially for the control of industrial processes. A total storage area is subdivided into partial storage areas, which are assigned to the stored program controls. Only in the start-up phase of a stored program control are complete data words transmitted, whereas during operation only data which has changed is transmitted.

14 Claims, 5 Drawing Sheets

| K | Z |
|---|---|

FIG.5

| K | Z | F | TB | TBL | BN | W |
|---|---|---|---|---|---|---|

MULTIPROCESSOR COMMUNICATION SYSTEM HAVING A PARITIONED MAIN MEMORY WHERE INDIVIDUAL PROCESSORS WRITE TO EXCLUSIVE PORTIONS OF THE MAIN MEMORY AND READ FROM THE ENTIRE MAIN MEMORY

BACKGROUND OF THE INVENTION

The present invention relates to a communication system, and, more particularly, to a system for communication between stored program controls.

Stored program controls have been decentralized to increase their efficiency. Small, locally distributed units take care of specific tasks for the control of industrial processes. If the solving of problems or the status of individual stored program controls is of importance for other stored program controls, these stored program controls must be able to communicate with one another by exchanging data. The requirements for a communication system will differ from case to case. For example, in office communication, maximum speed of data transmission is not of particular importance, while the control of industrial processes usually requires data processing in real time.

The coupling of stored program controls with one another can take place by parallel or serial coupling or over bus systems. During the time in which the coupled stored program controls exchange data with one another, these stored program controls, including their respective bus system, are blocked for other tasks. In data transmission, measures must be taken which increase the time required for the exchange of data. Such measures are, for example, the recognition of data losses, whereupon data must be retransmitted, and the recognition of a failure in the stored program controls. Invalid data must have a defined state, an interrupt treatment of important data must be provided, and test functions must exist which furnish to the user the state of all data elements. Furthermore, no so-called "deadlock" situations should be possible, in which data exchange does not occur due to undefined data states.

There is a need for a communication method which, taking into consideration all the aforementioned requirements, makes possible a very rapid data exchange of coupled data processing installations.

SUMMARY OF THE INVENTION

This and other needs are satisfied by the present invention for a communication system for stored program controls interconnected via a line system. The communication system has a number of features.

In a system with a plurality of stored program controls, less than all of the stored program controls can be selected for the communication system. A total storage area can be preset for these stored program controls participating in the communication system. A partial storage area within the total storage area can be assigned to each stored program control participating in the communication system. Certain storage locations within the total storage area can be preset for each stored program control participating in the communication system, such that they can be written to only by their respective stored program control. Each stored program control participating in the communication system can access all data in the total storage area.

To reduce the time required for the intercommunication between the stored program controls, the present invention provides that during the operation of the stored program controls, a data transmission to a respective partial storage area of a stored program control is effected only when a data change has occurred.

BRIEF DESCRIPTION OF THE DRAWINGS

FIGS. 5 and 6 are a schematic representation of communication words for data transmission.

DETAILED DESCRIPTION

Figure 1:
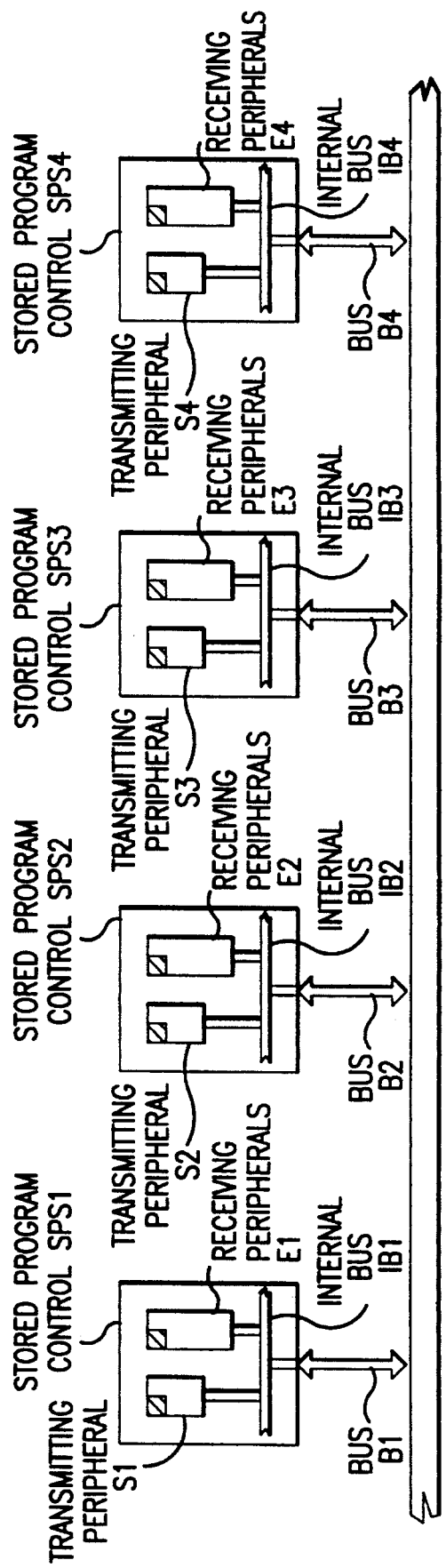
FIG. 1 is a block diagram of the interconnection of stored program controls over a bus system constructed according to the present invention.

Referring to FIG. 1 four stored program controls SPS1 . . . SPS4 are shown. Each stored program control SPS1 . . . SPS4 has two memories, symbolized in FIG. 1 by a black box in the upper left corner of a block. One memory represents the receiving peripherals E1 . . . E4 and one memory represents the transmitting peripherals S1 . . . S4 of the respective stored program controls SPS1 . . . SPS4. The transmitting and receiving peripherals S1 . . . S4, E1 . . . E4 each are coupled to a respective internal bus IB1 . . . IB4. Other elements, for example a processor, input/output components, an operating system memory, etc. can be coupled to each internal bus IB1 . . . IB4. However, for greater clarity these elements are not shown.

The stored program controls SPS1 . . . SPS4 may be entirely different equipment or devices. For instance, one stored program control may be part of a large computer installation, and another stored program control could be a single-frame control unit having minimal structure. The stored program controls SPS1 . . . SPS4 could, for example be control devices for automating technical processes, such as sensors, actuators, transducers, field multiplexers and field regulators.

The stored program controls SPS1 . . . SPS4 are coupled over buses B1 . . . B4 to a common bus system BS. Additional data processing installations, which can participate selectively in the communication system are also coupled to this bus system BS. [*For clarity, these additional data processing installations are not shown in FIG. 1.] That is, data processing installations which do not participate in the communication system of the stored program controls SPS1 . . . SPS4 but which use the same bus system may also be coupled to the bus system BS.[*]

The storage locations provided for the transmitting peripherals S1 . . . S4 and for the receiving peripherals E1 . . . E4 may be storage locations of specific memory components of the stored program controls SPS1 . . . SPS4, or they may represent storage locations of a total storage area of one particular stored program control SPS1 . . . SPS4. For the communication system it is important only that certain storage locations are assigned to the transmitting and to the receiving peripherals S1 . . . S4, E1 . . . E4. These storage locations are set up in the hardware in a known manner.

The transmitting and receiving peripherals S1 ... S4, E1 ... E4 of the stored program controls SPS1 ... SPS4 represent a number of storage locations which together form a total storage area. This total storage area will be explained in more detail with respect to FIG. 2.

Figure 2:
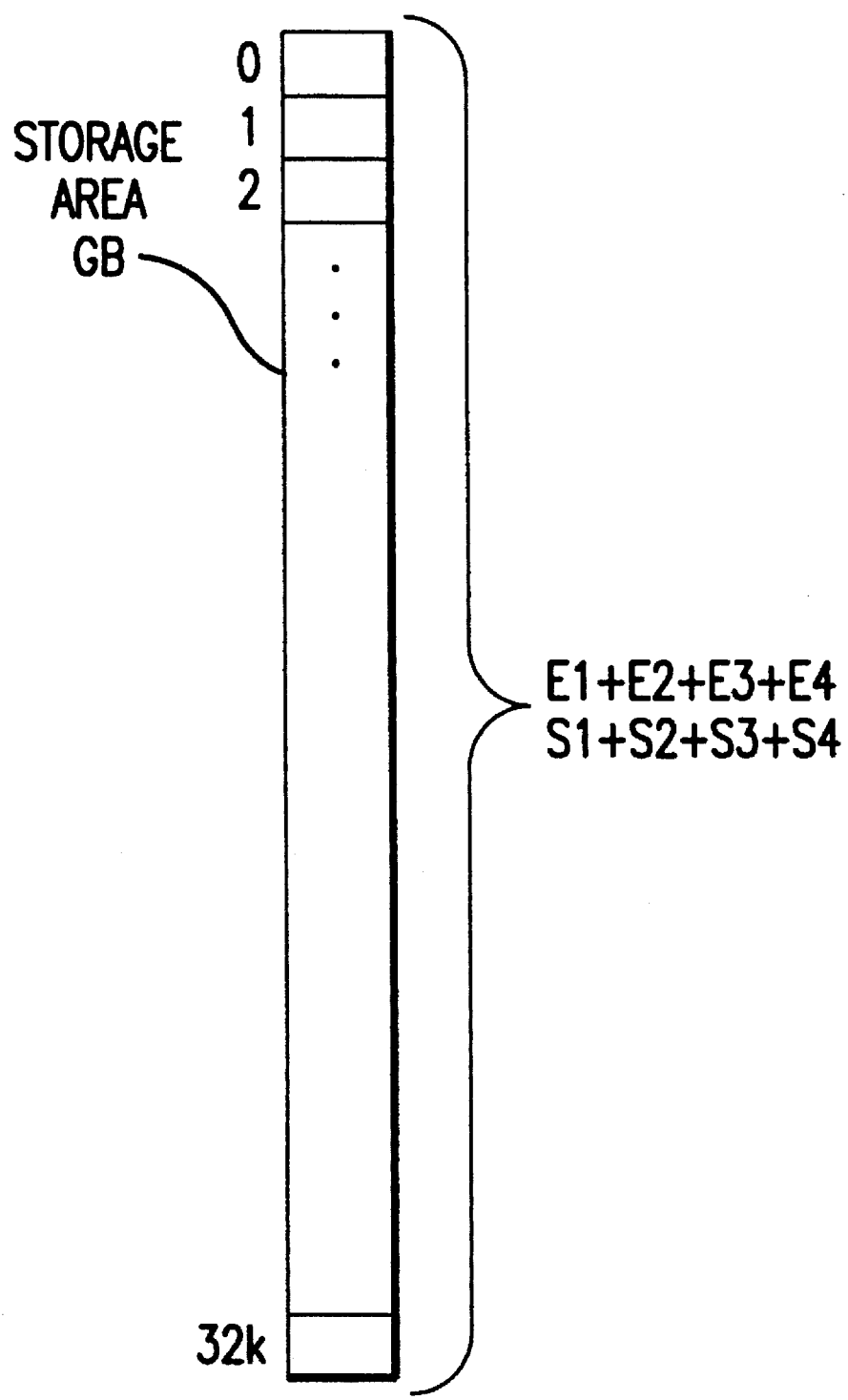
FIG. 2 is a schematic representation of a total storage area.

Referring to FIG. 2 the total storage area GB is shown. The total storage area GB comprises the storage locations of the transmitting and receiving peripherals S1 ... S4, E1 ... E4 of the stored program controls SPS1 ... SPS4. Thus the total storage area GB results from the storage areas of the receiving peripherals E1, E2, E3, and E4 and the transmitting peripherals S1, S2, S3, and S4. In the illustrated embodiment of FIG. 2, the total storage area GB has storage locations of 0 ... 32 k bits. This total storage area GB is available to the user of the communication system and can be allocated by the user to the various stored program controls SPS1 ... SPS4 participating in the communication system according to the particular case.

According to this embodiment of the invention, the user must, when taking the communication system into use, allocate the storage locations for the transmitting and receiving peripherals S1 ... S3, E1 ... E4 from the total area GB available. In an alternative embodiment of the present invention a fixed number of storage locations are assigned to a particular stored program control SPS1 ... SPS4. This will be explained more specifically with respect to FIG. 3.

Figure 3:
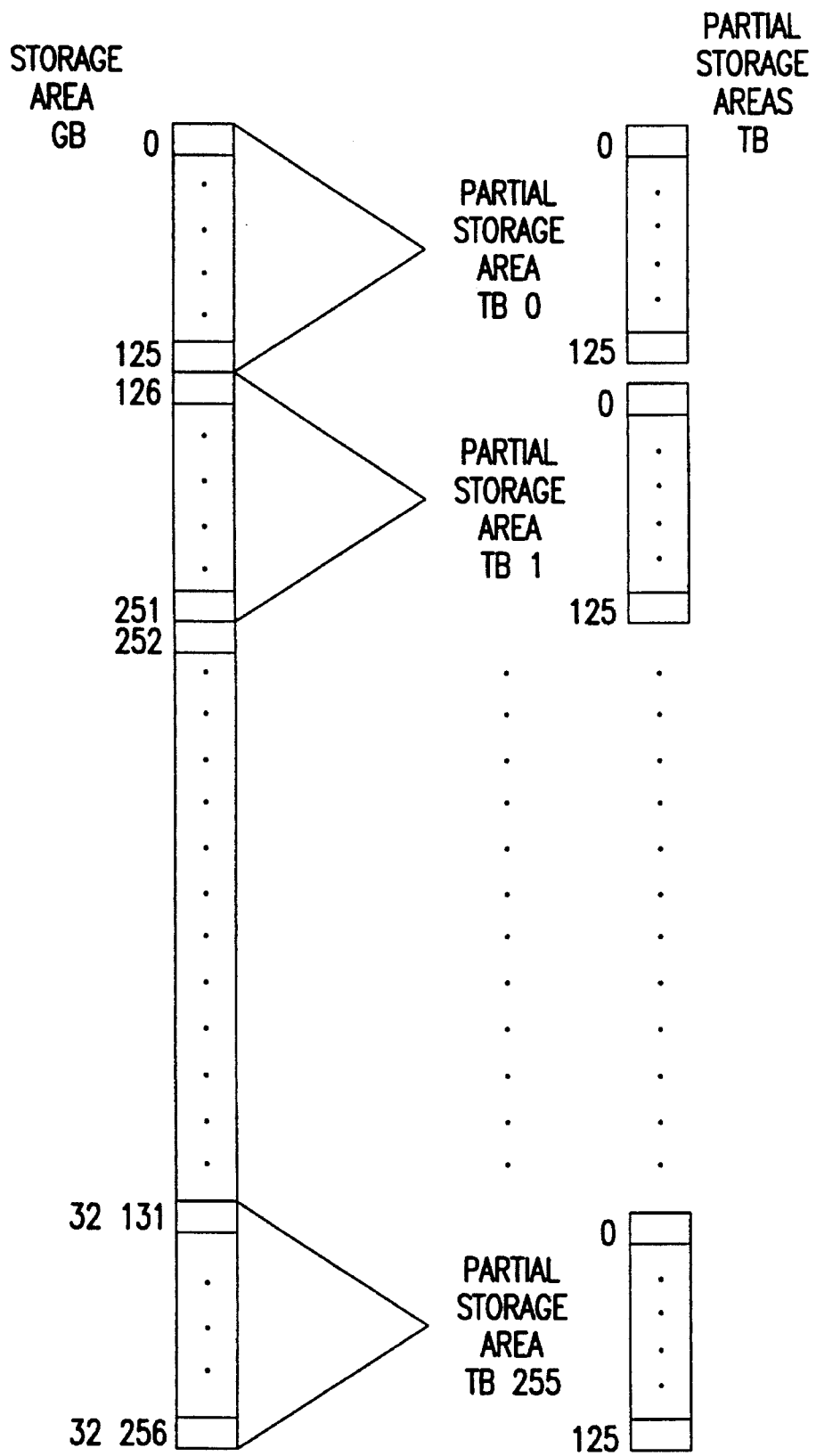
FIG. 3 is a schematic representation of a division of the total storage area into partial storage areas.

Referring to FIG. 3 the division of the total storage area GB into partial storage areas TB1 ... TB255 is shown. In this embodiment, the total storage area GB has a total of 32257 (0 ... 32256) storage locations. Each of the partial storage areas TB1 ... TB255 has 126 storage locations (0 ... 125), and each has a fixed assignment to a stored program control. In the present embodiment, for example, the partial storage areas TB1 ... TB4 could have a fixed assignment to the stored program controls SPS1 ... SPS4, while the remaining partial storage areas TB0, and TB5 ... TB255 are not allocated. However, this is not an unnecessary expenditure of storage locations. It is not necessary that the total storage area GB be available in the form of storage locations actually existing as to hardware, but exists merely as an imaginary storage area to be planned as needed.

The partial storage areas TB1 ... TB4 having a fixed assignment to the stored program controls SPS1 ... SPS4 include 126 (0-125) storage locations, respectively. These 126 storage locations of a stored program control can now be divided again and allocated either in a fixed or selective manner into storage locations for the transmitting peripherals S1 ... S4 and into storage locations for the receiving peripherals E1 ... E4.

The division of the total storage area GB into the partial storage areas TB has been described. To facilitate the comprehension of the communication process, the concept of combining the respective transmitting and receiving peripherals S1 ... S4, E1 ... E4 of a stored program control SPS1 ... SPS4 in a total storage area GB' will be described with reference to FIG. 4.

Figure 4:
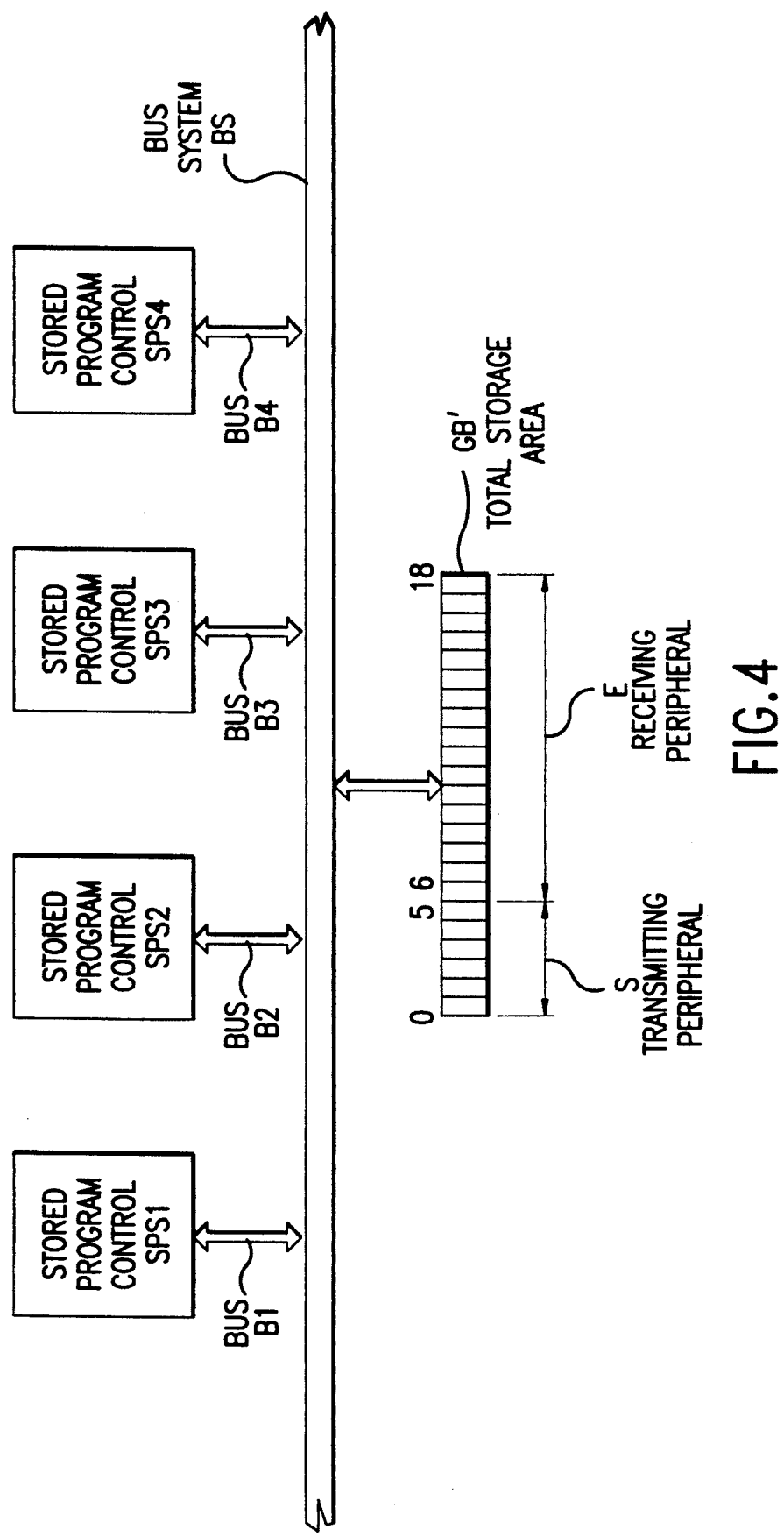
FIG. 4 is a block diagram of stored program controls connects over a bus system with a total memory constructed according to the present invention.

Referring to FIG. 4 the stored program controls SPS1 ... SPS4 which are coupled to the bus system BS via the buses B1 ... B4 are shown. The total storage area GB', which is divided into a transmitting peripherals S and a receiving peripherals E is coupled symbolically to the bus system BS. The transmitting and receiving peripherals S, E of the total storage area GB' is composed of the transmitting and receiving peripherals S1 ... S4, E1 ... E4. In the present embodiment, the total storage area GB' has a total of 19 storage locations. The storage locations 0 ... 5 being correlated with the transmitting peripherals S and the storage locations 6 ... 18 with the receiving peripherals E. Each storage location 0 ... 18 of the total storage area GB' may be written to only by one stored program control SPS1 ... SPS4, while each storage location 0 ... 18 can be read by each stored program control SPS1 ... SPS4. When the communication system is taken into operation, the total storage area GB' is at first completely written. During the process, however, only a so-called intelligent change transmission is effected. This means that in principle only changed data is transmitted between the individual data processors.

In an specific embodiment, the third stored program control SPS3 controls an industrial process, cyclically polling four valve positions. Of these four valve positions the first, third and fourth are important for the first stored program control SPS1. Now, if the first, second and third valve positions have changed, then only the data of the first and third valve positions are written into the transmitting peripherals S3, which is part of the transmitting peripherals S, of the third stored program control SPS3. Then, by a change word (which will be discussed later), the first and third valve positions are transmitted from the sending peripheral S3 to the receiving peripherals E1, which is part of the receiving peripherals E, of the first stored program control SPS1.

Complete data words of stored program controls SPS1 ... SPS4, on the other hand, are transmitted only in the start-up phase or in the internal error treatment. Thereby a high transmission rate is achieved.

For the transmission of data over the bus system BS it is advantageous in the present invention to define four different types of data words. They are a blank word, a change word, a full word, and a request word.

If in the transmitting peripherals S, the content of one or more storage locations has changed, a change word is normally transmitted in running operation. Since the entire content of the transmitter peripherals S is not transmitted each time, the time expenditures is thereby minimized.

A request word is requested by a stored program control SPS1 ... SPS4 when the latter has detected a word loss or when one of the stored program controls SPS1 ... SPS4 is in the start-up phase.

Full words serve to bring newly starting stored program controls SPS1 ... SPS4 to the current status of the transmitting peripherals S1 ... S4 as quickly as possible. In case a stored program control SPS1 ... SPS4 recognizes the loss of a word, it can prompt the respective sender by a request word to send a full word.

An essential feature of a full word is that it represents the image of a transmitting peripherals S1 ... S4 of a subscriber. The status of this image corresponds to the time of the sending of the last change word or of the initialization state of the sender. This means that a subscriber who was able to receive all change words of the sender does not get any new information through the arrival of the full word. It follows from this that as far as the receiver is concerned, full words are relevant only if either the latter is in the start-up phase or if a word loss has been recognized.

A blank word is used for recognizing possible word losses of the change word and full word types in the system. These losses are possible because both types are transmitted by an "unconfirmed" service, this having the advantage that the word can be sent to all bus subscribers simultaneously.

Blank words are always sent after a change word or a full word. In addition, blank words are sent cyclically whenever the "idle time" has come to an end after the last blank change or full word. The idle time is a compromise between an additional bus burden by blank words and the reaction time for recognizing a double word loss.

Figures 5, 6:
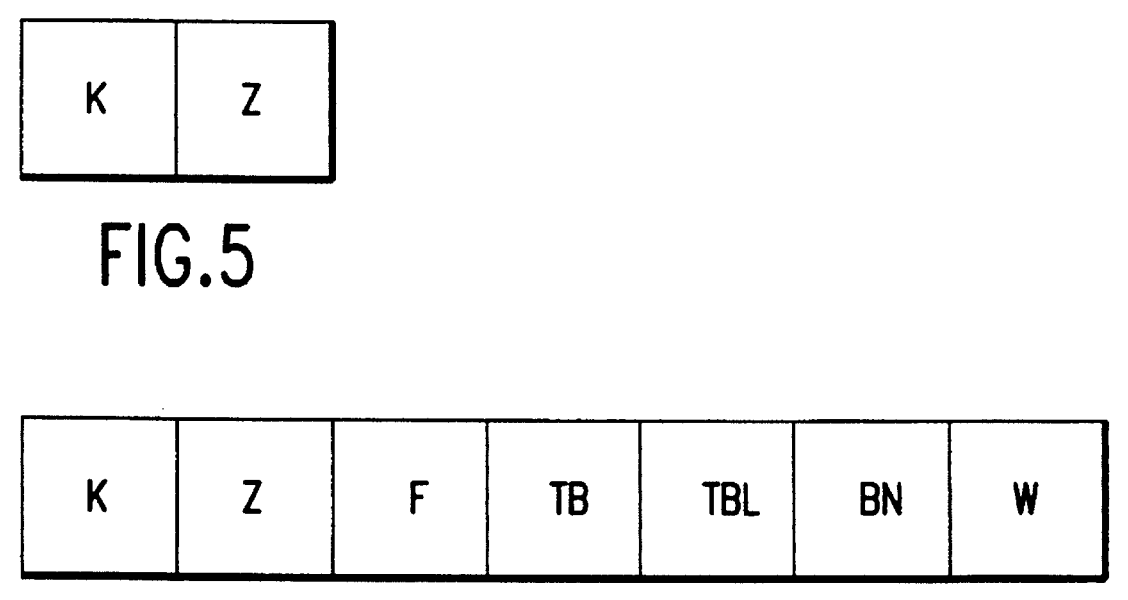

Referring to FIGS. 5 and 6 the described word types are shown. The first two symbols of a word are realized in the form of two bytes, the first byte representing an identification K and the second byte a cycle number Z. The identification K communicates to a stored program control SPS1 ... SPS4 the kind of word being sent, that is, which of the four word types is involved. The cycle number Z communicates to the stored program control SPS1 ... SPS4 the number of the respective word type. Because a stored program control SPS1 ... SPS4 knows the number of the respective preceding word type, it can establish whether a data loss has taken place between the new word and the last word type, i.e. whether a word was lost in the interim. These two bytes are sufficient for a blank word and a request word.

Referring to FIG. 6 the "change word" and "full word" types are shown. Besides the above described identification K and cycle number Z, the change word includes an error byte F, which reports to the receiver an error from the sender.

Within the change and full words, the storage locations are classified according to which partial storage area they belong. A partial storage area TB may indeed not be present, but a partial storage area TB must not be addressed twice within a word. In addition, the partial storage area length TBL, as well as the storage location number BN (byte number) and the value domain W are transmitted. The storage location number BN indicates what number byte within a partial storage area TB is involved. The value domain field W contains the current value of the byte addressed by the partial storage area TB field and the storage location number BN.

What is claimed:

1. A communications system comprising:
   a bus line system;
   a plurality of stored program controls coupled to said bus line system;
   a total storage area Capable of being read by all of said plurality of stored program controls, said total storage area divided into a plurality of partial storage areas;
   each of said plurality of stored program controls being exclusively assigned to one of said plurality of partial storage areas, such that ones of said stored program controls can only write to its exclusively assigned partial storage area; and
   all of said partial storage areas being accessible to be read by each of said stored program controls.

2. The system of claim 1, wherein during a start-up operation, data is transmitted from at least one of said stored program controls to its exclusively assigned partial storage area.

3. The system of claim 1, wherein data transmission to an exclusively assigned partial storage area of a first one of said plurality of stored program controls is performed upon request of a second one of said plurality of stored program controls.

4. The system of claim 1, wherein exclusive assignment of ones of said partial storage areas to ones of said stored program controls is performed selectively.

5. The system of claim 1, wherein exclusive assignment of ones of said partial storage areas to ones of said program controls is predetermined.

6. The system of claim 1, wherein at least one of said plurality of stored program controls selectively participates in said communication system.

7. The system of claim 1, wherein respective processes are controlled by each of said stored program controls, and data variables within said stored program controls change in dependance on operation of said processes, such that a data transmission from a first one of said stored program controls to its exclusively assigned partial storage area occurs only when at least one data variable value within said first one of said stored program controls changes.

8. A method of communicating information between stored program controls over a bus system, comprising:
   dividing a total storage area into a plurality of partial storage areas;
   assigning an exclusive partial storage area to each one of the stored program controls; and
   arranging each partial storage area such that ones of said stored program controls can only write to its exclusively assigned partial storage area and can be read by each of said stored program controls.

9. The method of claim 8, wherein an exclusive assignment of one of said partial storage areas to a stored program control is performed selectively.

10. The method of claim 8, wherein exclusive assignment of ones of said partial storage areas to ones of said stored program controls is predetermined.

11. The method of claim 8, further comprising:
    designating at least two of said plurality of stored program controls to participate in said communication system.

12. The method of claim 8, further comprising:
    controlling respective processes by each of said stored program controls;
    changing data variables within said stored program controls in dependance on operation of said processes; and
    transmitting data from a first one of said stored program controls to its exclusively assigned partial storage area only when at least one data variable value within said first one of said stored program controls changes.

13. The method of claim 12, and further comprising:
    transmitting data from at least one of said stored program controls to its exclusively assigned partial storage area during a start-up operation.

14. The method of claim 12, wherein transmitting data to said partial storage area of one of said stored program controls occurs in response to a transmission of a request word by one or more stored program controls.

* * * * *